US007305099B2

(12) United States Patent
Gustavsson

(10) Patent No.: US 7,305,099 B2
(45) Date of Patent: Dec. 4, 2007

(54) ELECTRONIC DEVICES, METHODS, AND COMPUTER PROGRAM PRODUCTS FOR DETECTING NOISE IN A SIGNAL BASED ON AUTOCORRELATION COEFFICIENT GRADIENTS

(75) Inventor: Stefan Gustavsson, Helsingborg (SE)

(73) Assignee: Sony Ericsson Mobile Communications AB (SE)

( * ) Notice: Subject to any disclaimer, the term of this patent is extended or adjusted under 35 U.S.C. 154(b) by 966 days.

(21) Appl. No.: 10/639,561

(22) Filed: Aug. 12, 2003

(65) Prior Publication Data

US 2005/0038838 A1 Feb. 17, 2005

(51) Int. Cl.
*H04R 25/00* (2006.01)
*H04R 29/00* (2006.01)
*H04B 15/00* (2006.01)

(52) U.S. Cl. ....................... 381/317; 381/56; 381/94.1; 381/94.2; 381/94.3

(58) Field of Classification Search ................ 381/317, 381/318, 92, 94.1, 94.2, 94.3, 95, 91, 56, 381/58, 94.4–94.8; 73/861.06; 702/191
See application file for complete search history.

(56) References Cited

U.S. PATENT DOCUMENTS 4,401,849 A 8/1983 Ichikawa et al. ......... 179/1 SC
5,495,242 A * 2/1996 Kick et al. .................. 340/902
5,732,141 A 3/1998 Chaoui et al. ................ 381/56
2002/0037088 A1 3/2002 Dickel et al. ............... 381/317

FOREIGN PATENT DOCUMENTS

EP 0596785 A1 5/1994
WO WO 2004/008804 A1 1/2004

OTHER PUBLICATIONS

Gustavsson, Stefan, U.S. Appl. No. 10/295,698, filed Nov. 15, 2002.
International Search Report and Written Opinion related to PCT/EP2004/007096 mailed Oct. 1, 2004.

* cited by examiner

*Primary Examiner*—Vivian Chin
*Assistant Examiner*—Douglas Suthers
(74) *Attorney, Agent, or Firm*—Myers Bigel Sibley & Sajovec, P.A.

(57) ABSTRACT

An electronic device can be operated to detect noise, such as wind noise. A microphone signal is generated by a microphone. Autocorrelation coefficients are determined based on the microphone signal. Gradient values are determined from the autocorrelation coefficients. The presence of a noise component in the microphone signal is determined based on the gradient values

7 Claims, 4 Drawing Sheets

ELECTRONIC DEVICES, METHODS, AND COMPUTER PROGRAM PRODUCTS FOR DETECTING NOISE IN A SIGNAL BASED ON AUTOCORRELATION COEFFICIENT GRADIENTS

BACKGROUND OF THE INVENTION

The present invention relates to signal processing technology, and, more particularly, to methods, electronic devices, and computer program products for detecting noise in a signal.

Wind noise may be picked up by a microphone used in devices such as mobile terminals and hearing aids, for example, and may be a source of interference for a desired audio signal. The sensitivity of an array of two or more microphones may be adaptively changed to reduce the effect of wind noise. For example, an electronic device may steer the directivity pattern created by its microphones based on whether the electronic device is operating in a windy environment.

In U.S. Patent Application Publication US 2002/0037088 by Dickel et al. and U.S. patent application Ser. No. 10/295,968 by Stefan Gustavsson, a windy environment is detected by analyzing the output signals of two or more microphones.

SUMMARY OF THE INVENTION

According to some embodiments of the present invention, a noise component, such as wind noise is detected in an electronic device. A microphone signal is generated by a microphone. Autocorrelation coefficients are detected based on the microphone signal. Gradient values are determined from the autocorrelation coefficients. The presence of the noise component in the microphone signal is determined based on the gradient values. Accordingly, some embodiments may detect wind noise in a microphone signal from a single microphone. In contrast, earlier approaches used signals from more than one microphone to detect wind noise.

In further embodiments of the present invention, various characteristics of the gradient values from the autocorrelation coefficients may be used to determine the presence of the noise component. The presence of the noise component may be determined based on the smoothness of the gradient values. For example, the determination may be based on whether a rate of change of the gradient values satisfies a threshold value.

In other embodiments, the determination may be based on when the gradient values satisfy a threshold value. In still other embodiments, sampled values of the microphone signal may be generated that are delayed by a range of delay values. Autocorrelation coefficients may be generated based on the delayed sampled values of the microphone signal. The presence of a noise component may be determined based on whether the gradient values are about equal to a threshold value within a subset of the range of delay values. The determination may be based on whether the gradient values are substantially zero for delay values that are substantially non-zero. The determination may additionally, or alternatively, be based on whether the gradient values have a zero crossing for delay values that are substantially non-zero.

Although described above primarily with respect to method aspects of the present invention, it will be understood that the present invention may be embodied as methods, electronic devices, and/or computer program products.

DETAILED DESCRIPTION OF PREFERRED EMBODIMENTS

Figure 1:
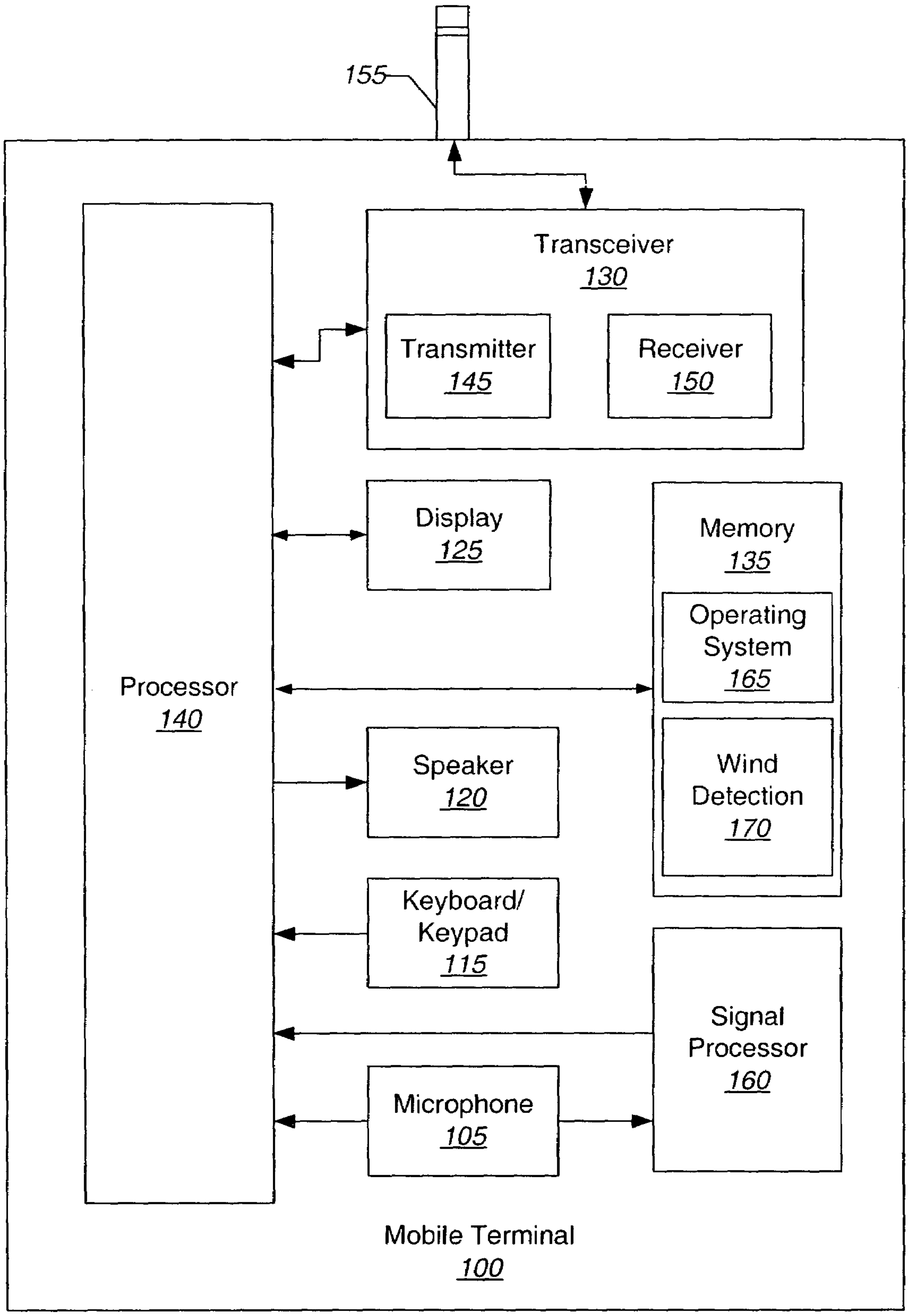
FIG. 1 is a block diagram that illustrates a mobile terminal in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. It should be further understood that the terms "comprises" and/or "comprising" when used in this specification are taken to specify the presence of stated features, integers, steps, operations, elements, and/or components, but do not preclude the presence or addition of one or more other features, integers, steps, operations, elements, components, and/or groups thereof.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The present invention is described herein in the context of detecting wind noise as a component of a microphone signal in a mobile terminal. It will be understood, however, that the present invention may be embodied in other types of electronic devices that incorporate one or more microphones, such as, for example automobile speech recognition systems, hearing aids, etc. Moreover, as used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

It should be further understood that the present invention is not limited to detecting wind noise. Instead, the present invention may be used to detect noise that is relatively correlated in time.

Referring now to FIG. 1, an exemplary mobile terminal 100, in accordance with some embodiments of the present invention, comprises a microphone 105, a keyboard/keypad 115, a speaker 120, a display 125, a transceiver 130, and a memory 135 that communicate with a processor 140. The transceiver 130 comprises a transmitter circuit 145 and a receiver circuit 150, which respectively transmit outgoing radio frequency signals to, for example, base station transceivers and receive incoming radio frequency signals from, for example, base station transceivers via an antenna 155. The radio frequency signals transmitted between the mobile terminal 100 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 100 may be included in many conventional mobile terminals and their functionality is generally known to those skilled in the art.

The processor 140 communicates with the memory 135 via an address/data bus. The processor 140 may be, for example, a commercially available or custom microprocessor. The memory 135 is representative of the one or more memory devices containing the software and data used by the processor 140 to communicate with a base station. The memory 135 may include, but is not limited to, the following types of devices: cache, ROM, PROM, EPROM, EEPROM, flash, SRAM, and DRAM, and may be separate from and/or within the processor 140.

As shown in FIG. 1, the mobile terminal 100 further comprises a signal processor 160 that is responsive to an output microphone signal from the microphone 105, and is configured to generate one or more output signals that are representative of whether the mobile terminal is in a windy environment or in a no-wind environment. The memory 135 may contain various categories of software and/or data, including, for example, an operating system 165 and a wind detection module 170. The operating system 165 generally controls the operation of the mobile terminal. In particular, the operating system 165 may manage the mobile terminal's software and/or hardware resources and may coordinate execution of programs by the processor 140. The wind detection module 170 may be configured to process one or more signals output from the signal processor 160, which indicate whether the mobile terminal 100 is in a windy environment or a no-wind environment, and to selectively use, and/or modify the use Of, one or more noise suppression algorithms and/or sound compression algorithms based on the wind or no-wind environment indication. Accordingly, the wind detection module 170 may operate to reduce the effect of a wind component in the microphone signal from the microphone 105.

Figure 3:
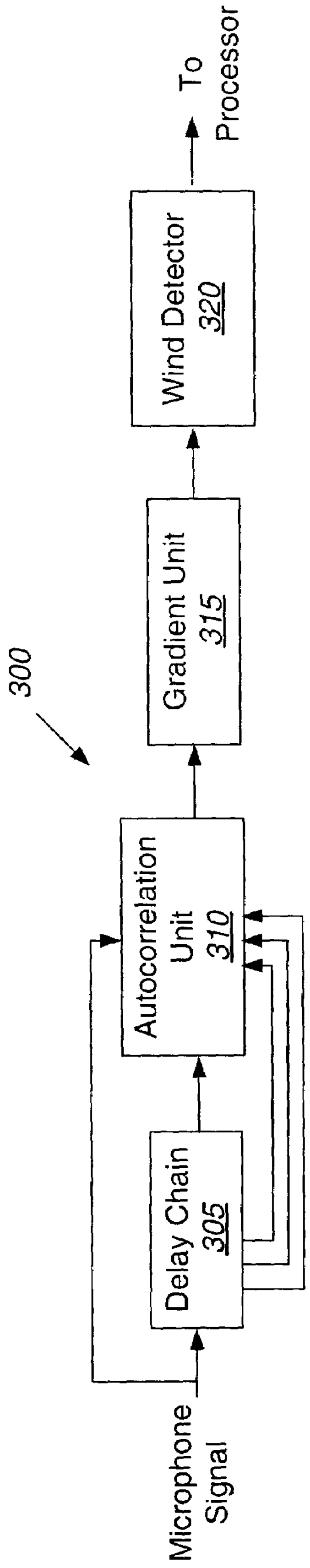
FIG. 3 is a block diagram that illustrates a signal processor that may be used in electronic devices, such as the mobile terminal of FIG. 1, in accordance with some embodiments of the present invention.

Referring now to FIG. 3, an exemplary signal processor 300 that may be used, for example, to implement the signal processor 160 of FIG. 1 will now be described. The signal processor 300 comprises a delay chain 305 having N delay elements, an autocorrelation unit 310, a gradient unit 315, and a wind detector 320 that are connected in series to form a system for detecting the presence of a wind component in a microphone signal.

The delay chain 305 is responsive to samples of a microphone signal at different times, delays the samples by delay values, and provides the samples of the microphone signal, the sample times, and the delay values to the autocorrelation unit 310. In some embodiments of the delay chain 305, the microphone signal is delayed by delay values that are in a range that extends above and below zero (i.e., positive and negative delay values). The delay chain 305 may weight the samples, such that newer samples are weighted greater than older samples. If the microphone signal is given by s and the number of delay elements is N, then the autocorrelation unit 310 may generate autocorrelation coefficients R( ) at delay k according to Equation 1 below:

$$R(k) = \frac{1}{N-k}\sum_{n=1}^{N-k} s(n)s(n+k) \qquad \text{Equation 1}$$

The gradient unit 315 generates gradient values from the autocorrelation coefficients. The gradient values are based on how the autocorrelation coefficients change relative to the delay values and/or time values for the sampled microphone signal (e.g., slope associated with adjacent autocorrelation coefficients).

Figure 2:
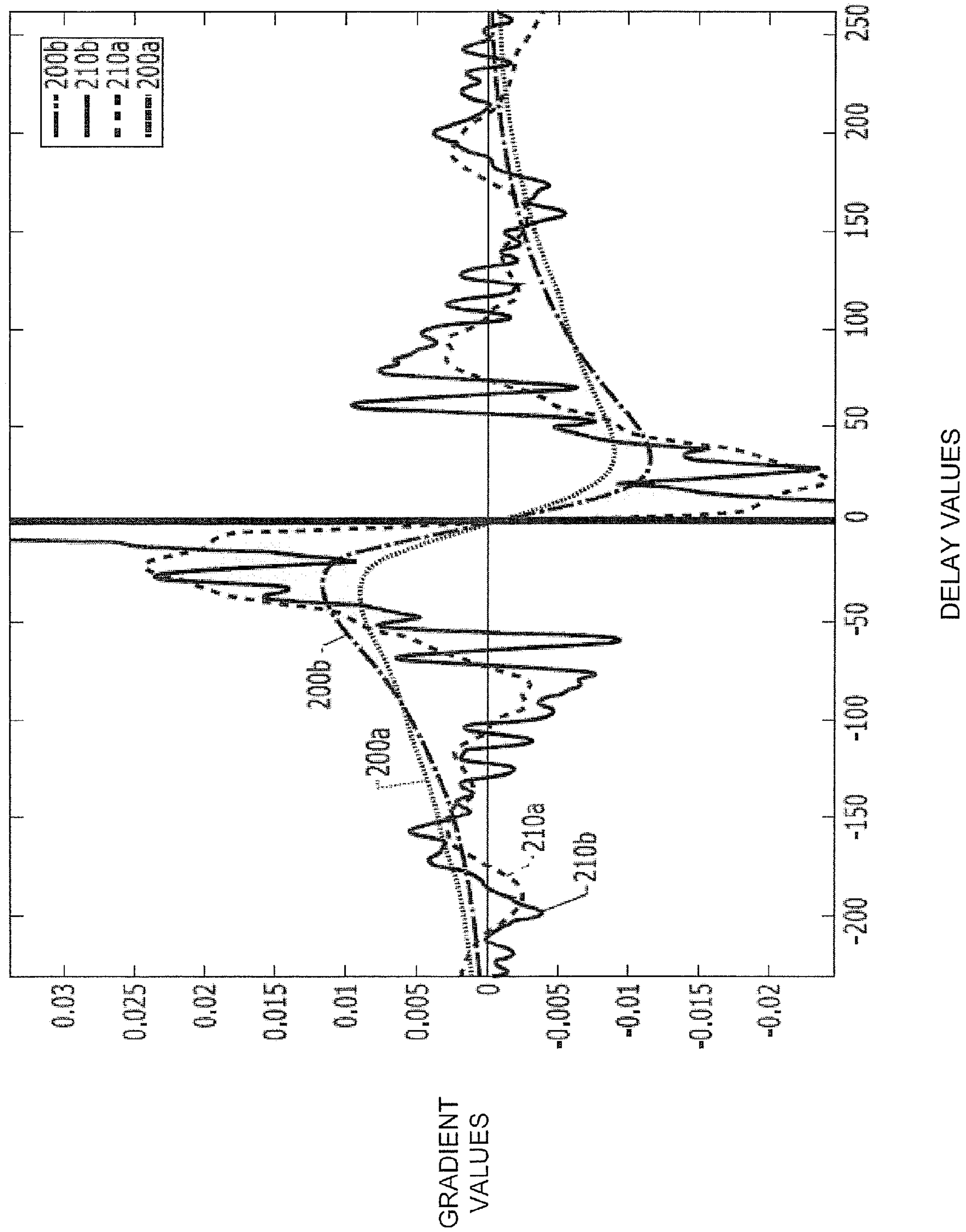
FIG. 2 is graph of autocorrelation coefficient gradients as a function of sample delay values for wind conditions and no-wind conditions.

FIG. 2 illustrates example graphs of experimental data that was developed by subjecting a microphone to windy environment and no-wind environment inside and outside of a laboratory. The graphed curves represent gradient values that have been formed from the autocorrelation coefficients of the microphone signal versus delay values. Curves 200*a-b* were developed from the microphone signal in a no-wind condition (i.e., the microphone signal did not have a wind component). In contrast, curves 210*a-b* were developed from the microphone signal in a wind condition (i.e., the microphone signal had a wind component).

As shown in FIG. 2, the curves 200*a-b* and 210*a-b* demonstrate different characteristics based upon whether the microphone signal has a wind component. For example, although the gradient values for curves 200*a-b* and 210*a-b* change sign (i.e., change from positive to negative and/or vice-versa) by crossing the zero axis (zero crossing) for a substantially zero delay value, the curves 210*a-b* (wind component) also have zero crossings at some substantially non-zero delay values. For example, curves 210*a-b* have zero crossings at delay values between about −125 and about −100 and between about 50 and about 75. The gradient values for curves 200*a-b* also have substantially higher peaks near, for example, the zero delay value compared to the gradient values for curves 200*a-b*. The gradient values for curves 200*a-b* are also smoother over a range of delay values (i.e., smaller rate of change) compared to the gradient values for curves 210*a-b*.

According to some embodiments of the present invention, the wind detector 320 determines whether the microphone signal includes a wind component based on the gradient values from the gradient unit 315. The determination may be based on whether the gradient values pass through a known threshold value within a subset of the range of the delay values. For example, the threshold value may be zero and the subset of the range of the delay values may have substantially non-zero values, so that a zero crossing by the gradient values may indicate the presence of a wind component in the microphone signal. The known threshold value may be a non-zero value to, for example, compensate for bias in the gradient values and/or to change the sensitivity of the determination relative to a threshold amount of the wind component in the microphone signal.

The determination by the wind detector 320 may also, or may alternatively, be based on when the gradient values satisfy a threshold value. The threshold value may, for example, comprise positive and negative threshold values that are selected so that when one or both of the threshold values are exceeded by the gradient values, a wind component is determined to be in the microphone signal. For example, as illustrated in FIG. 2, the gradient values of the curves 210*a-b* have substantially larger values than those of the curves 200*a-b*, such that the wind detector 320 may compare the gradient values in a region near, for example, the zero delay to one or more threshold values to identify the presence of a wind component. The determination by the wind detector 320 may also, or may alternatively, be based on the smoothness of the gradient values. For example, the determination may be based on when a rate of change of the gradient values relative to corresponding delay values and/or time satisfies one or more threshold values. For example, as illustrated in FIG. 2, the curves 200*a-b* are substantially smoother over the delay values than the curves 210*a-b*. Curves 210*a-b* exhibit substantially more rapid fluctuation of gradient values than those of the curves 200*a-b* over corresponding delay values, so that the wind detector 320 may compare the gradient values in a region near, for example, the zero delay to one or more threshold values to identify the presence of a wind component.

The result of the determination by the wind detector 320 may be provided to a processor, such as the processor 140 of FIG. 1, where it may then be processed by the wind detection module 170 of FIG. 1.

For purposes of illustration only, FIG. 3 illustrates components that may be used to determine the presence of a wind component in a microphone signal based on the gradient of the autocorrelation coefficients. It should be understood that another set of components corresponding one or more of the delay chain 305, the autocorrelation unit 310, the gradient unit 315, and the wind detector 320 may be provided to determine the presence of a wind component in a microphone signal from another microphone. In this manner, the present invention may be extended to embodiments of electronic devices comprising one or more microphones. However, some embodiments may detect wind noise in a microphone signal from a single microphone. In contrast, earlier approaches used signals from more than one microphone to detect wind noise, which can increase the complexity of the associated circuitry and increase the number of components that are needed to detect wind noise.

Although FIG. 3 illustrates an exemplary software and/or hardware architecture of a signal processor that may be used to detect wind noise in sound waves received by an electronic device, such as a mobile terminal, it will be understood that the present invention is not limited to such a configuration but is intended to encompass any configuration capable of carrying out the operations described herein. For example, the operations that have been described with regard to FIG. 3 may be performed at least partially by the processor 140, the signal processor 160, and/or other components of the wireless terminal 100.

Figure 4:
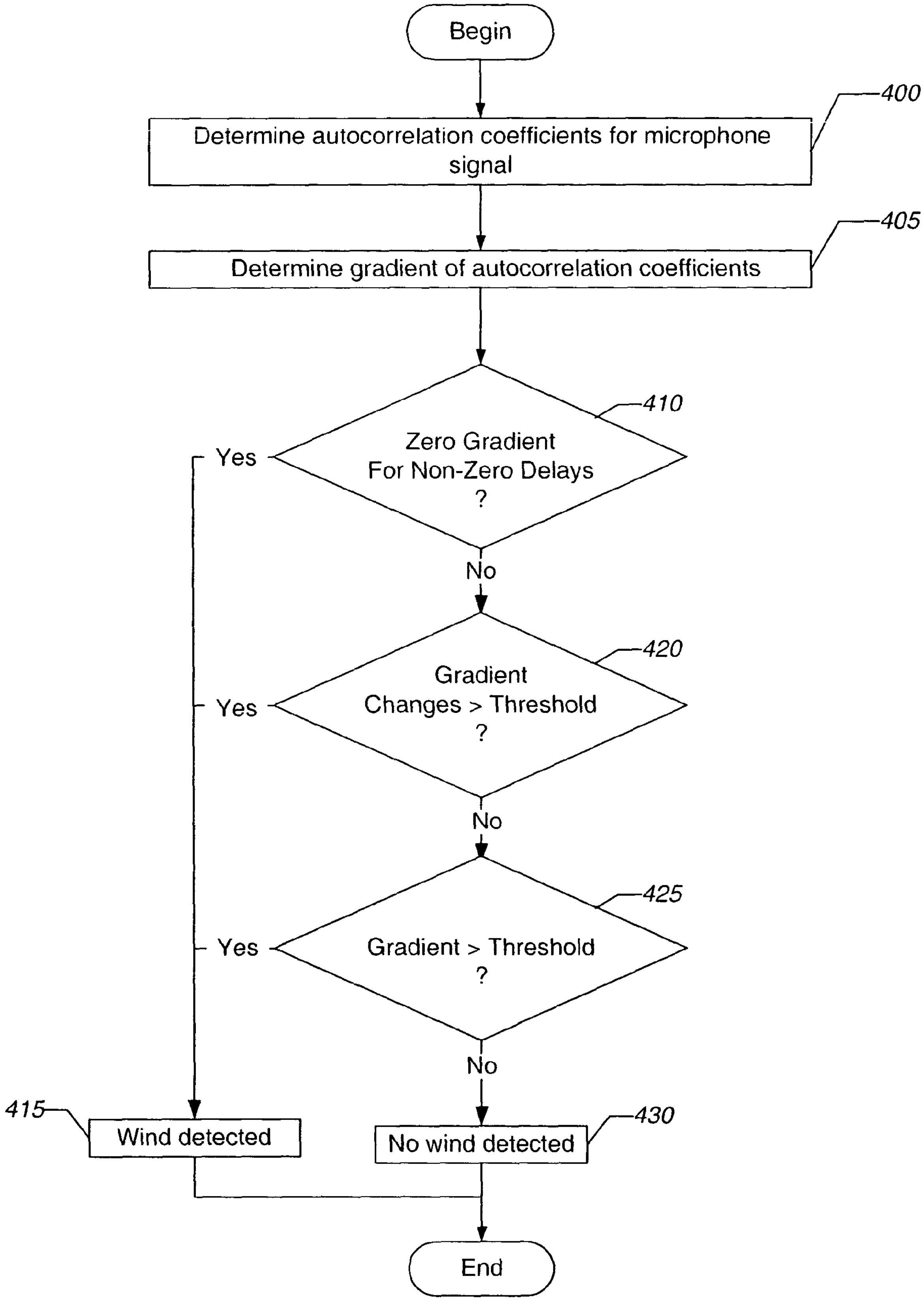
FIG. 4 is a flowchart that illustrates operations for detecting noise in a microphone signal in accordance with some embodiments of the present invention.

Reference is now made to FIG. 4 that illustrates the architecture, functionality, and operations of some embodiments of the mobile terminal 100 hardware and/or software. In this regard, each block represents a module, segment, or portion of code, which comprises one or more executable instructions for implementing the specified logical function (s). It should also be noted that in other implementations, the function(s) noted in the blocks may occur out of the order noted in FIG. 4. For example, two blocks shown in succession may, in fact, be executed substantially concurrently or the blocks may sometimes be executed in the reverse order, depending on the functionality involved.

With reference to FIG. 4, operations begin at block 400 where autocorrelation coefficients are determined for a microphone signal, such as a signal that is output by microphone 105 of FIG. 1. At block 405, gradient values are determined from the autocorrelation coefficients. A determination is then made at block 410 whether the gradient values are substantially zero (e.g., zero crossing) for substantially non-zero delay values. The determination at block 410 may alternatively include comparing the gradient values to a non-zero threshold value, as was previously described with regard to the wind detector 320 of FIG. 3. If the gradient values are substantially zero, then a determination may be made at block 415 that a wind component is included in the microphone signal. If however, the gradient values are not substantially zero, at block 410, a determination may be made at block 420 as to whether the gradient values change more than a threshold amount for corresponding delay values and/or time, and if they do, a determination may be made at block 415 that a wind component is included in the microphone signal. Otherwise at block 420, a determination may be made at block 425 as to whether the gradient values exceed a threshold amount, and if they do, a determination may be made at block 415 that a wind component is included in the microphone signal, or otherwise a determination may be made at block 430 that a wind component is not included in the microphone signal. In other embodiments, various sub-combinations of blocks 410, 420, and 425 may be used to detect the presence or absence of wind.

In some embodiments of the present invention, hysteresis may be used, for example, in block 415 and/or block 430, Such that a wind component is and/or is not detected unless the conditions of blocks 410, 420, and/or 425 are met and/or not met for a known number of gradient numbers, delay values, and/or time. According, the sensitivity of a wind detector to a brief presence of a noise component in a microphone signal may be adjusted.

Computer program code for carrying out operations of the wind detection program module 170 and/or the signal processor 160 discussed above may be written in a high-level programming language, such as C or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program and/or processing modules may also be implemented using discrete hardware components, one or more application specific integrated circuits (ASICs), or a programmed digital signal processor or microcontroller.

Although FIGS. 1, 3, and 4 illustrate exemplary software and hardware architectures that may be used to detect wind noise in a signal received by an electronic device, such as a mobile terminal, it will be understood that the present invention is not limited to such a configuration but is intended to encompass any configuration capable of carrying out the operations described herein. Accordingly, many variations and modifications can be made to the preferred embodiments without substantially departing from the principles of the present invention. All such variations and modifications are intended to be included herein within the scope of the present invention, as set forth in the following claims.

That which is claimed is:

1. A method of operating an electronic device, comprising:

generating a microphone signal by a microphone;

determining autocorrelation coefficients based on the microphone signal;

determining gradient values from the autocorrelation coefficients; and determining presence of a noise component in the microphone signal based on an amount of variation of the gradient values over time.

2. The method of claim 1, wherein determining the presence of a noise component comprises determining the presence of wind noise in the microphone signal.

3. A method of operating an electronic device, comprising:

generating a microphone signal by a microphone;

determining autocorrelation coefficients based on the microphone signal;

determining gradient values from the autocorrelation coefficients; and determining presence of a noise component in the microphone signal based on whether a rate of change of the gradient values satisfies a threshold value.

4. An electronic device, comprising:

a microphone that is configured to generate a microphone signal;

an autocorrelation unit that is configured to generate autocorrelation coefficients based on the microphone signal;

a gradient unit that is configured to generate gradient values from the autocorrelation coefficients; and a wind detector that is configured to determine presence of a noise component in the microphone signal based on an amount of variation of the gradient values over time.

5. A computer program product configured to process a microphone signal produced by a microphone in an electronic device, comprising:

a computer readable storage medium having computer readable program code embodied therein, the computer readable program code comprising:

computer readable program code for determining autocorrelation coefficients based on the microphone signal;

computer readable program code for determining gradient values from the autocorrelation coefficients; and computer readable program code for determining the presence of a noise component in the microphone signal based on an amount of variation of the gradient values over time.

6. The computer program product of claim 5, wherein:

the computer readable program code for determining autocorrelation coefficients comprises computer readable program code for generating sampled values of the microphone signal that are delayed by a range of delay values, and computer readable program code for generating autocorrelation coefficients based on the delayed sampled values of the microphone signal; and the computer readable program code for determining the presence of the noise component comprises computer readable program code for determining whether the gradient values are about equal to a defined value for delay values that are substantially non-zero.

7. The computer program product of claim 6, wherein the computer readable program code for determining the presence of a noise component comprises computer readable program code for determining whether the gradient values have a threshold crossing for delay values that are substantially non-zero.

* * * * *

UNITED STATES PATENT AND TRADEMARK OFFICE

CERTIFICATE OF CORRECTION

PATENT NO. : 7,305,099 B2
APPLICATION NO. : 10/639561
DATED : December 4, 2007
INVENTOR(S) : Gustavsson It is certified that error appears in the above-identified patent and that said Letters Patent is hereby corrected as shown below:

Column 4, Line 49: Please correct "values for curves 200*a-b*"
to read -- values for curves 210*a-b* --

Signed and Sealed this

First Day of December, 2009

David J. Kappos
*Director of the United States Patent and Trademark Office*